United States Patent [19]

Backhaus et al.

[11] Patent Number: 5,054,810

[45] Date of Patent: Oct. 8, 1991

[54] VEHICLE WITH A SAFETY SYSTEM

[75] Inventors: Hans-Gert Backhaus; Elmar Vollmer, both of Wettstetten, Fed. Rep. of Germany

[73] Assignee: Audi AG., Ingolstadt, Fed. Rep. of Germany

[21] Appl. No.: 272,833

[22] PCT Filed: Nov. 14, 1986

[86] PCT No.: PCT/EP86/00657

§ 371 Date: Jun. 29, 1990

§ 102(e) Date: Jun. 29, 1990

[87] PCT Pub. No.: WO87/04673

PCT Pub. Date: Aug. 13, 1987

[30] Foreign Application Priority Data

Jan. 31, 1986 [DE] Fed. Rep. of Germany ....... 3602923

[51] Int. Cl.[5] ..................... B60R 21/32

[52] U.S. Cl. ..................... 280/734; 280/777; 180/274

[58] Field of Search ..................... 280/734, 737, 777; 180/274

[56] References Cited

U.S. PATENT DOCUMENTS

| | | | |
|---|---|---|---|
| 3,269,310 | 8/1966 | Wismer | 102/531 |
| 3,768,831 | 10/1973 | Wesselman et al. | 180/274 |
| 4,566,555 | 1/1986 | Schlanger | 280/777 |
| 4,703,827 | 11/1987 | Vollmer et al. | 180/274 |
| 4,795,189 | 1/1989 | Vollmer et al. | 180/274 |
| 4,823,905 | 4/1989 | Piech | 180/274 |
| 4,884,652 | 12/1989 | Vollmer | 280/777 |

FOREIGN PATENT DOCUMENTS

| | | | |
|---|---|---|---|
| 0199024 | 4/1985 | European Pat. Off. . | |
| 2211355 | 5/1973 | Fed. Rep. of Germany | 280/737 |
| 7218668 | 2/1974 | Fed. Rep. of Germany . | |
| 2374188 | 12/1977 | France . | |
| 2559439 | 2/1985 | France . | |
| WO8501707 | 10/1984 | World Int. Prop. O. . | |

*Primary Examiner*—Kenneth R. Rice

*Attorney, Agent, or Firm*—Karl Hormann

[57] ABSTRACT

A safety system for a vehicle is disclosed. The system includes a means for pulling the steering wheel/column away from the driver in the event of a head-on collision, and an inflatable cushion which is mounted on the steering wheel. The pulling away of the steering wheel triggers the inflation of the cushion. Also disclosed is a similar safety system for the passenger side of the vehicle.

13 Claims, 1 Drawing Sheet

VEHICLE WITH A SAFETY SYSTEM

FIELD OF THE INVENTION

The invention relates to vehicles equipped with occupant safety systems, particularly automobiles equipped with inflatable air cushions.

BACKGROUND OF THE INVENTION

Automobile accidents kill or injure thousands of people annually. Safety belts are only effective if worn, and even then may be of limited use in certain types of collisions. Another type of safety system for a vehicle driver provides an inflatable air cushion, or a so-called "airbag", in the region of the steering wheel. The airbag is connected to a propellant charge, which is detonated via a sensor upon impact. The charge fills the bag with air, or other gas, thereby providing a cushion to soften the impending impact. A further air-cushion unit can also be attached to the dashboard for the front-seat passenger.

Currently used airbag systems are not without problems, however. For example, the release sensors constitute a safety risk since they can malfunction, releasing the propellant unexpectedly in non-collision situations. In known electrical sensors, there is also the need to check the electrical detonation circuits regularly, since faults, such as short-circuiting, ground contact and cutouts, can lead to the failure or malfunctioning of the air-cushion unit. Also, electrical connections, for example slip-ring connections to the moveable steering wheel, and the air-cushion unit mounted in the center of the steering wheel, are relatively expensive to produce and, in the event of an accident, can be destroyed even before the sensors are released.

Previously-used release sensors are "acceleration" sensors, which react to the collision deceleration in an accident. In order to function reliably, the sensors must be able to distinguish between situations in which there should be no release of the air cushion, such as fast-operation decelerations due to hard braking and small minor accidents, and a serious head-on collision, wherein inflation of the air cushion should occur. The higher the acceleration values required for a release operation, the greater the safeguard against a release malfunction. However, sensors utilizing collision deceleration for release are not always able to satisfactorily distinguish between decelerations for which inflation should occur and those for which it should not.

A frequent effect of a sharp head-on collision is that the vehicle driver strikes the steering wheel with his head, despite having his safety belt fastened. This is caused by the sharp forward shift of the upper part of the body and the head and/or by the steering wheel being thrust into the passenger space via the steering column as a result of the impact. German Offenlegungsschrift 1,655,597 therefore proposes, in the event of a head-on collision, to pull the steering wheel away from the possible head impact region towards the dashboard by means of a cable guided via a deflection device.

In vehicles without a device for pulling away the steering wheel, the steering column together with the steering wheel can assume an upright position in a head-on collision, so that the air cushion is not inflated towards the upper part of the body of the vehicle driver, but possibly only meets the driver's head. There is therefore the danger of serious injury caused by the dipping of the upper part of the body.

SUMMARY OF THE INVENTION

According to the present invention, an inflatable air or gas cushion is provided in the region of the steering wheel, adjacent a device which pulls away the steering wheel upon impact, providing a great advantage in that the release mechanism for sensing the need to inflate the air cushion is dependent on the pulling away of the steering wheel, greatly reducing the chance for inflation malfunction.

The feature that an acceleration sensor as a release mechanism for inflating the air cushion is mounted on the steering wheel or on an upper part of the steering column, which steering wheel and/or column are pulled away from the driver in the event of a head-on collision ensures that the acceleration sensor experiences a very sharp acceleration for release. The acceleration sensed by the release mechanism as a result of the pulling away of the steering wheel are of the order of several hundred "g's" (acceleration due to gravity), which is substantially higher than the collision deceleration. The high steering wheel acceleration is measured and evaluated by the acceleration sensor, so that the release mechanism can be made very safe against unintentional releases, because of the high release force available. Furthermore, the release mechanism allows a clear distinction to be made concerning whether there is only a slight collision, in which the inflation of the air cushion is not effected, or a sharp collision with a shift of the drive unit relative to the car body under a sharp impact, with the necessary release of the air cushion.

The release mechanism preferably operates purely mechanically, eliminating the need for electrical connections, which are susceptible to faults and may be unreliable especially in accidents. Furthermore, it is possible to do without monitoring and checking of such electrical detonation circuits because of the present invention's independence from the vehicle power supply.

Because of the locally confined arrangement of the air-cushion unit and release mechanism on the steering wheel, the necessary short release times are guaranteed, even when pyrotechnic lines or direct mechanical connections are used between the release mechanism reacting to acceleration and the gas generator of the air-cushion unit.

In one preferred embodiment of the present invention, a sensor mass, which is accelerable in the event of a head-on collision, is positioned between a striker, which striker is prestressed by a spring means, and a detonation device for a gas generator of the air-cushion unit. In a head-on collision, the sensor mass moves away from the region of the striker, with the result that the striker is released suddenly and strikes the detonation device because of the spring prestress. Such a release mechanism can be produced simply and compactly and functions reliably. Because of the high acceleration forces available, due to the collapsing or pulled-away steering wheel/column, release of the detonation device could also occur directly as a result of the movement of the sensor mass, in which case the sensor mass would act as the striker.

In another preferred embodiment of the invention, a release mechanism of the safety system is used for a front-seat passenger. Since no steering wheel is pulled away on the front-seat passenger side, the above-described high acceleration values are not available for releasing a further air cushion. In order to ensure a reliable release, which prevents undesirable releases, for example, in the event of only a slight collision, there is provided a release mechanism which contains a similar spring-prestressed striker opposite a detonation device. However, in this embodiment of the invention, the striker and the detonation device are held at a distance from one another by means of a bolt, the bolt being connected directly to a cable, which cable is guided via a deflecting unit. In the event of a relatively sharp head-on collision in which a relative movement takes place between the drive unit and the car body or the fastening point of the deflecting unit, the bolt is released and the detonation device is actuated by the striker.

A release mechanism according to a preferred embodiment of the present invention works purely mechanically without electrical connections, the detonation device containing a detonating cap with a pyrotechnic line to the gas generator. There is thus no need for a connection to the vehicle electrical system.

Of course, the above-described release mechanism with the prestressed striker can also be used when the detonation device contains an electrical detonation circuit. In this arrangement the striker can activate the electrical detonation circuit for release reliably in specific dangerous situations.

According to another preferred embodiment of the invention, it is expedient to combine the air-cushion unit and the release mechanism into one unit which can be preassembled and, if appropriate, retrofitted simply.

Other details, objects and advantages of the invention will become apparent as the following description of the presently preferred embodiments and presently preferred methods of practicing the invention proceeds.

BRIEF DESCRIPTION OF THE DRAWINGS

The invention, together with further features, particulars and advantages, is explained in more detail by means of the following drawings, which are exemplary.

DETAILED DESCRIPTION OF THE INVENTION

Figure 1:
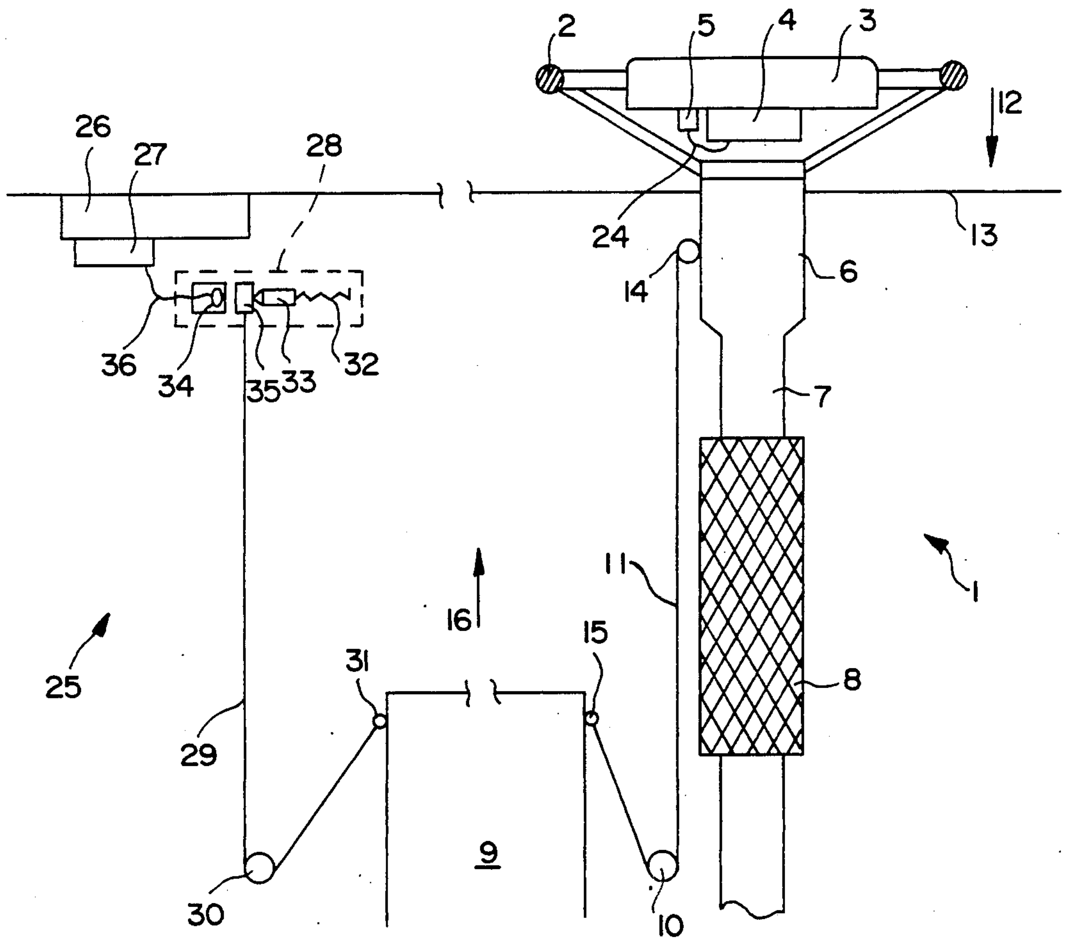
FIG. 1 shows a schematic plan view of the driver's and front-seat passenger's positions in the region of the dashboard with a preferred embodiment of the invention depicted therein.

FIG. 1 illustrates a safety system 1 with a steering wheel 2, and air-cushion unit 3 in the impact plate of the steering wheel 2, a gas generator 4, a release mechanism 5, a steering column jacket 6 connected to the steering wheel 2, a steering column 7, a grid tube 8, an engine block 9, a deflecting unit 10 and a cable 11. The safety system 1 is intended for the vehicle driver.

In the event of a head-on collision, the steering wheel 2 is pulled towards the dashboard 13 in the direction of the arrow 12 out of a possible head impact region of the vehicle driver. For this purpose, the cable 11 is connected at one end to a fastening point 14 on the steering column jacket 6 and at the other end to a fastening point 15 on the engine block 9. Under a relatively sharp head-on collision, the engine block 9 is shifted rearwards (upwards in FIG. 1) in the direction of the arrow 16. As a result of the deflecting unit 10, which is secured to a structural part of the vehicle body so as to remain substantially firmly positioned with respect to the relative rearward movement 16 of the engine block or drive unit 9, this rearward movement of the drive unit 9 is transmitted as a pulling movement ot the steering wheel 2 via the cable 11. The deflecting unit 10 is preferably a roller means. Upon the pulling of the steering wheel 2, the grid tube 8 is intentionally collapsed in the steering column 7, further enabling the steering wheel to be pulled away from the driver. This pulling movement of the steering wheel, during which an acceleration of several hundred g occurs, is also used to release the air-cushion unit 3.

Figure 2:
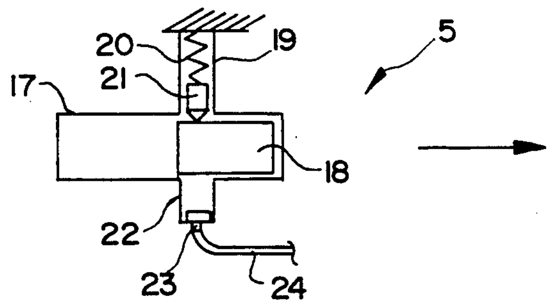
FIG. 2 shows a schematic representation of a mechanical release mechanism of the present invention.

For this purpose, there is provided a release mechanism 5 which is shown in more detail in FIG. 2. A sensor mass 18 is mounted movably in a tubular housing 17 and positioned on one side of the housing 17. The sensor mass 18 preferably takes up less than half the length of the housing 17 as illustrated. A pointed striker 21 is positioned in a tubular piece 19, which piece 19 is perpendicular relative to the housing 17. The striker 21 is biased against the sensor mass 18 by a spring means 20. Opposite the striker 21, a detonating cap 23 rests in a recess 22 in the housing and is connected to the gas generator 4 via a pyrotechnic line 24 (see also FIG. 1). The arrow indicates the direction of travel of the vehicle and consequently the direction of installation of the release mechanism 5.

The safety system 1 functions as follows: in the event of a relatively sharp head-on collision, the engine block 9 or drive unit parts connected to it are shifted sharply rearwardly in the direction of the arrow 16, with the result that the cable 11 (due to the deflecting unit 10) pulls the steering wheel 2 and consequently the release mechanism 5 and the housing 17 sharply forwardly (in the direction of travel, indicated by the arrow in FIG. 2 and arrow 12 in FIG. 1) in an accelerated manner. As a result of the inertia of the sensor mass 18, the relative motion of the sensor mass 18 with respect to the housing 17 is such that the sensor mass 18 moves to the left-hand side of the housing 17, thereby clearing the way for the prestressed striker 21 to strike the detonating cap 23 in order to release the air-cushion unit 3 or the gas generator 4. The cushion unit 26 and release mechanism 5 are preferably formed as a unit as illustrated.

The front seat passenger safety system 25 of the present invention is also illustrated in FIG. 1. This system is of simpler design than other passenger safety systems, since the air cushion does not come out of an operationally movable structural part which is accelerated sharply during a head-on collision. The safety system 25 of the present invention contains an air-cushion unit 26 with a gas generator 27, a release mechanism 28, a cable 29, a deflecting device 30 and a fastening point 31 for the cable 29. The fastening point 31 is located on the engine block 9 or on a structural part connected to the engine block 9.

The release mechanism for the passenger safety system is also composed of a striker means 33 prestressed by a spring means 32 and a detonating cap 34 located opposite the striker means 33 and being separated therefrom by a bolt means 35. The detonating cap 34 is connected to the gas generator 27 via a pyrotechnic line 36. The cable 29 is fastened directly to the bolt 35 designed as a spacer means.

The safety system 25 functions as follows: in the event of a head-on collision, the movement of the engine block 9 according to the arrow 16 is transmitted directly to the bolt 35 by means of the cable 29 via the deflecting device 30, which may be a roller means. This cable movement in turn withdraws the bolt 35 and clears the way for the striker 33 to strike the detonating cap 34, which in turn causes the gas generator 27 to be detonated via the pyrotechnic line 36.

The release mechanism 28 is shown diagrammatically and enlarged for illustration and appropriately forms a unit with the air-cushion unit 26 or the gas generator 27.

The bolt 35 and the sensor mass 18 can be held securely and without the danger of premature release malfunctions in a manner known to those skilled in the art, for example by means of predetermined breaking connecting (not shown).

Although the invention has been described in detail in the foregoing for the purpose of illustration, it is to be understood that such detail is solely for that purpose and that variations can be made therein by those skilled in the art without departing from the spirit and scope of the invention as described by the claims.

I claim:

1. In an apparatus for enhancing the safety of a person in an automotive vehicle of the kind comprising a chassis having a portion deforming in a collision of a predetermined force, drive means mounted for movement relative to said chassis in response to the deformation, steering means mounted on a column extending in the direction of said person, elongate means connected to said chassis and said drive means for displacing said steering means in a direction away from said person in response to said movement, first inflatable means for providing protection between said person and said steering means in such collision, the improvement comprising:

means for inflating said inflatable means in response to the displacing of said steering means.

2. The apparatus of claim 1, wherein said means for inflating comprises inertia means moving in response to the displacement of said steering means from a first to a second position.

3. The apparatus of claim 2, wherein said means for inflating further comprises gas generating means actuated by an explosive charge, said inertia member when moving to its second position releasing firing means of said gas generating means.

4. The apparatus of claim 3, wherein said firing means comprises spring-loaded striker means separated from an ignition means cap when said inertia means is in its first position and movable to strike said detonation cap when said inertia means is in its second position.

5. The apparatus of claim 4, wherein said inertia means is mounted for movement along a path intersecting said striker means and said ignition means.

6. The apparatus of claim 5, wherein said inertia means is retained in its first position by frangible means.

7. The apparatus of claim 4, wherein said ignition means comprises detonation cap means.

8. The apparatus of claim 4, wherein said ignition means comprises electrical ignition means.

9. The apparatus of claim 1, comprising further inflatable means and said inflating means comprises means responsive to said movement of said drive means.

10. The apparatus of claim 9, wherein said inflating means comprises latch means operatively connected to said drive means by elongated means for movement from a first to a second position in response to said movement of said drive means, said latch means when in its first position retaining spring-biased striker means against movement and when in its second position releasing said striker means to move into engagement with ignition means.

11. The apparatus of claim 10, wherein said latch means is movable along a path intersecting said striker means and said ignition means.

12. The apparatus of claim 11, wherein said ignition means comprises detonating cap means.

13. The apparatus of claim 11, wherein said ignition means comprises electric ignition means.

* * * * *